March 29, 1932.  H. L. PITMAN ET AL  1,851,059
AUTOMATIC GEAR SHIFTING MECHANISM
Filed Dec. 16, 1930    4 Sheets-Sheet 1
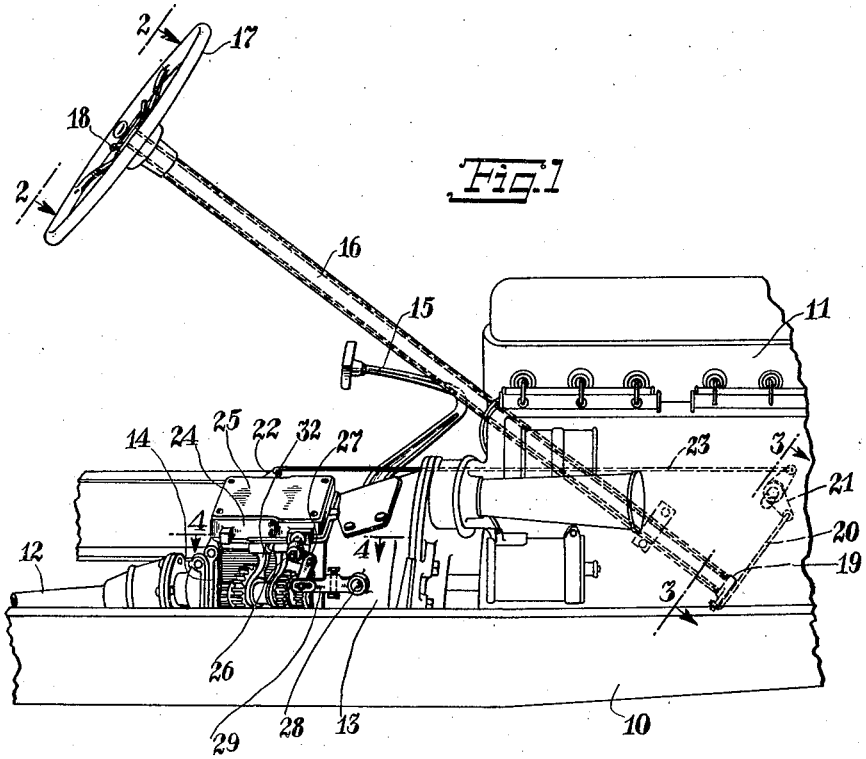
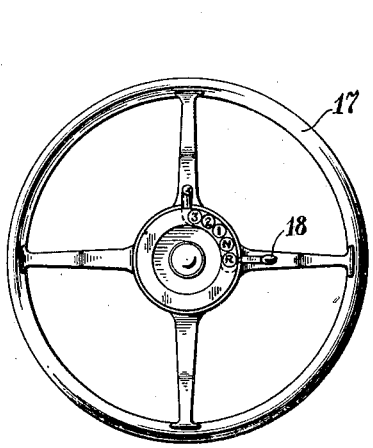
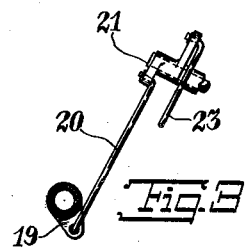
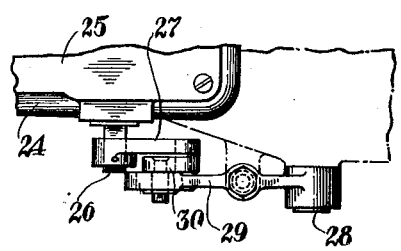
INVENTORS
Henry L. Pitman
Alfred G.F. Kurowski
BY
Redding, Greeley, O'Shea & Campbell
ATTORNEYS INVENTORS
Henry L. Pitman
Alfred G.F. Kurowski
BY
Redding, Greeley, O'Shea & Campbell
ATTORNEYS March 29, 1932.  H. L. PITMAN ET AL  1,851,059
AUTOMATIC GEAR SHIFTING MECHANISM
Filed Dec. 16, 1930  4 Sheets-Sheet 3
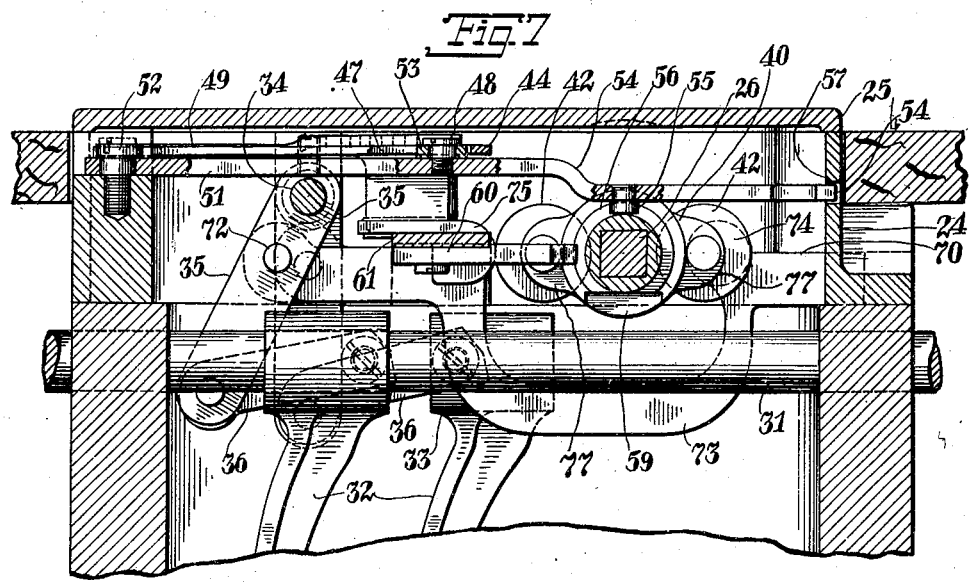
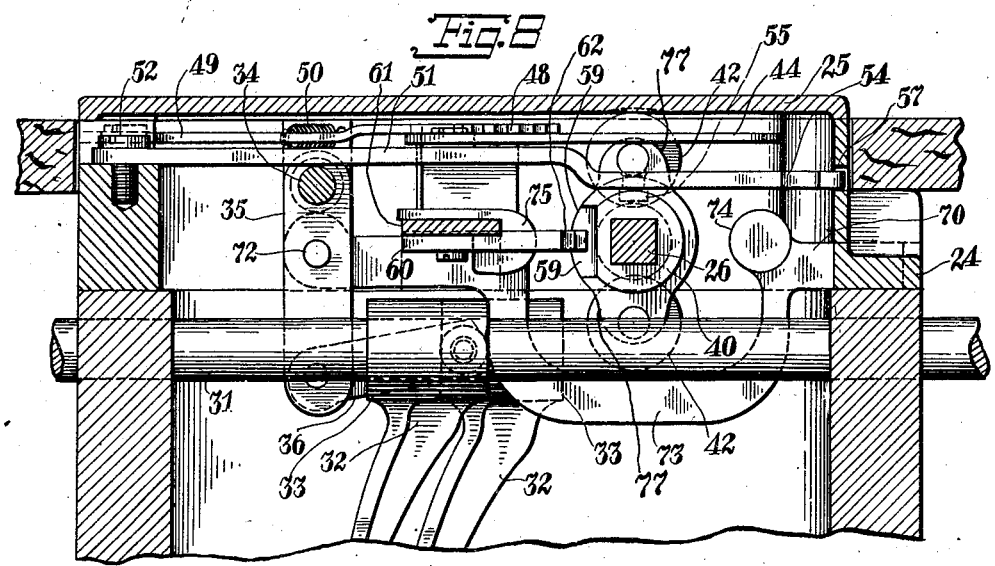
INVENTORS
Henry L. Pitman
BY Alfred G. F. Kurowski
Redding, Greeley, O'Shea & Campbell
ATTORNEYS

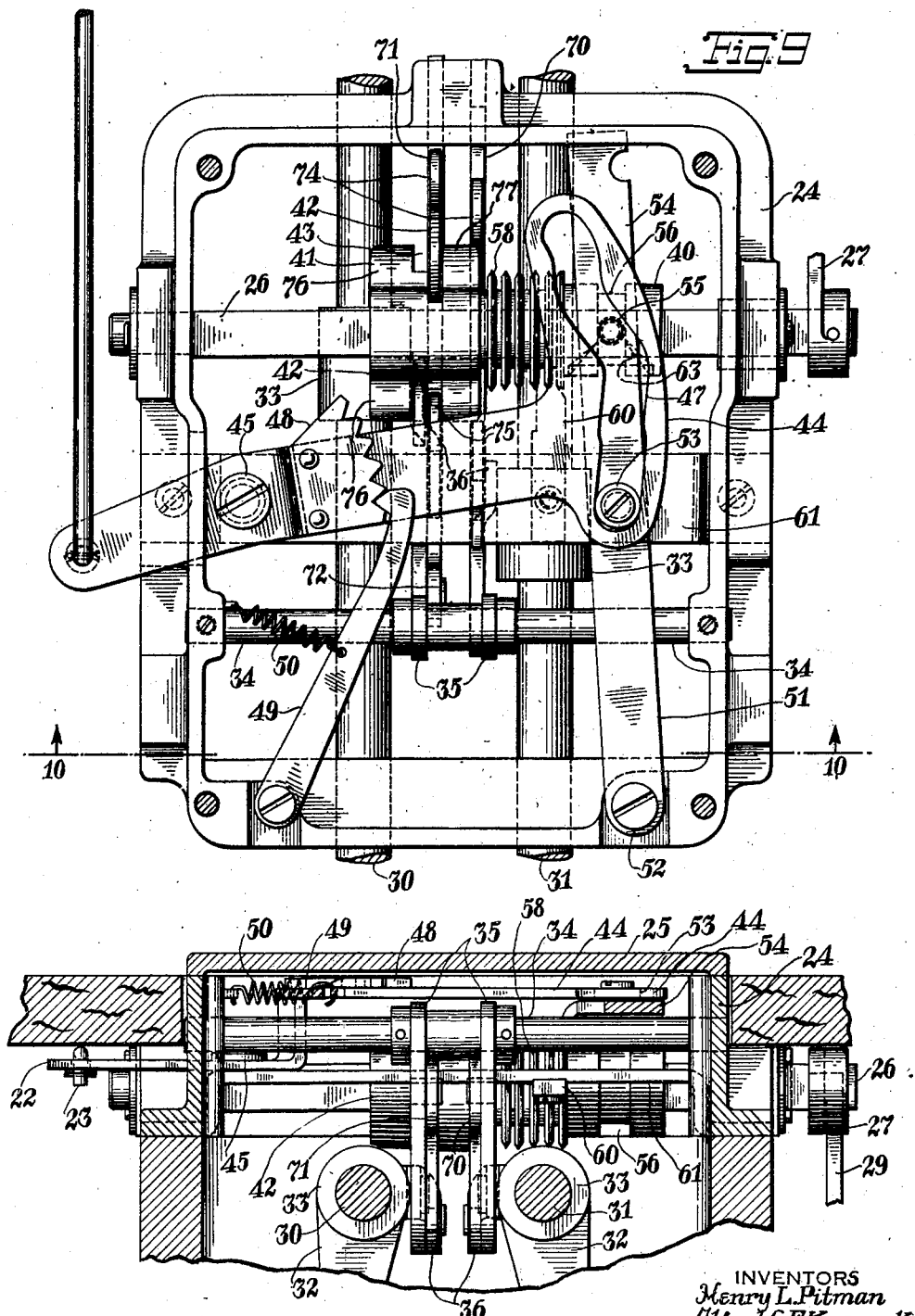

Patented Mar. 29, 1932　　　　　　　　　　　　　　　　1,851,059

UNITED STATES PATENT OFFICE

HENRY L. PITMAN, OF WESTFIELD, NEW JERSEY, AND ALFRED G. F. KUROWSKI, OF BROOKLYN, NEW YORK, ASSIGNORS TO AUTO SHIFT CORPORATION, OF NEW YORK, N. Y., A CORPORATION OF NEW YORK

AUTOMATIC GEAR SHIFTING MECHANISM

Application filed December 16, 1930. Serial No. 502,678.

The present invention relates to mechanisms for shifting the gears of a vehicle transmission and embodies, more specifically, an improved device which permits a plurality of gear connections to be selected manually, the actuation of the vehicle clutch serving to effect the selected change. More specifically, the invention embodies an improved mechanism by means of which the gears of a vehicle transmission are selected and shifted, the usual gear shift lever of the standard forms of transmissions now available being dispensed with and a hand operated arm being provided on the steering wheel for selecting a desired shifting operation. The mechanism by means of which the foregoing is accomplished is of such character as to be readily adapted to be applied to a standard transmission mechanism of any type now in use and furthermore is sufficiently compact that the elements of the vehicle chassis need not be disturbed when the device is applied.

An object of the invention, therefore, is to provide a device of the above character, wherein a manual selective mechanism is provided for effecting a predetermined gear shifting operation and means is further provided, actuated by the clutch mechanism of the vehicle, to perfect the shifting operation. In this connection it is contemplated that the shifting member of the mechanism be movable as a unit and associated with cooperating mechanism in such fashion as to prevent more than one shifting operation to take place at the same time, and further prevent the perfection of a shifting operation until a previously engaged set of gears has been disengaged to clear the mechanism for the proposed shift.

A further object of the invention is to provide a device of the above character, wherein an extremely accurate selective mechanism is provided, the machined elements thereof being reduced to a minimum without destroying the accuracy of the mechanism.

A further object of the invention is to provide a locking mechanism to prevent an incorrect engagement of the elements of the shifting mechanism and thus eliminate any danger of an imperfect shift.

Further objects, not specifically enumerated above, will be apparent as the invention is described in greater detail in connection with the accompanying drawings, wherein:

Figure 1 is a perspective view of a portion of a vehicle chassis upon which a device constructed in accordance with the present invention has been installed.

Figure 2 is a plan view, taken on line 2—2 of Figure 2, showing the selective mechanism embodied upon the steering wheel of a motor vehicle chassis.

Figure 3 is a view in section, taken on line 3—3 of Figure 1, and showing the manner of transmitting the motion of the selective mechanism to the shifting mechanism mounted upon the transmission.

Figure 4 is a view taken on line 4—4 of Figure 1, showing the manner in which the shifting actuation is derived from the clutch actuating mechanism.

Figure 7 is a view in section, taken on line 7—7 of Figure 5 and looking in the direction of the arrows.

Figure 8 is a view similar to Figure 7, showing the mechanism actuated to effect a different change speed connection.

Figure 9 is a plan view, similar to Figure 5, showing the mechanism actuated to effect the first speed connection of the gears of the transmission.

Figure 10 is a view in section, taken on line 10—10 of Figure 9, and looking in the direction of the arrows.

Figure 5:
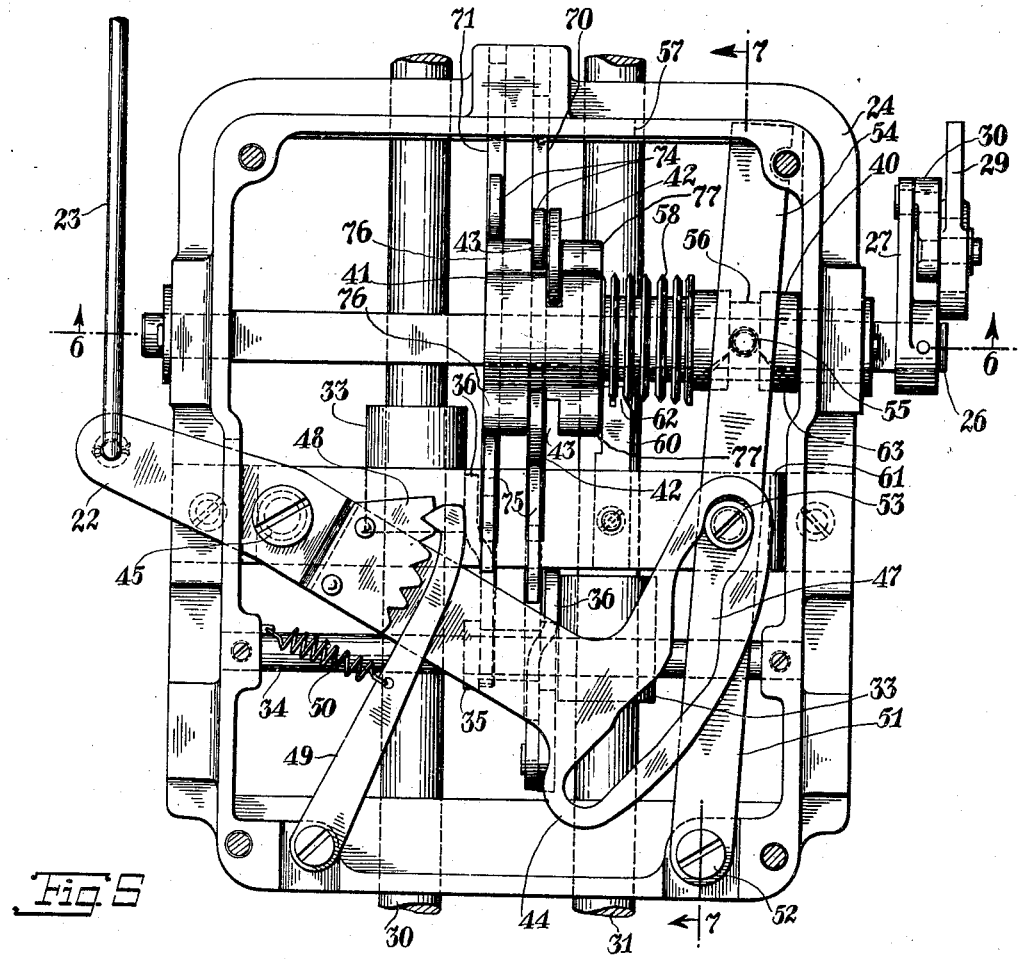
Figure 5 is a plan view of the shifting mechanism of the present invention.
Figure 6:
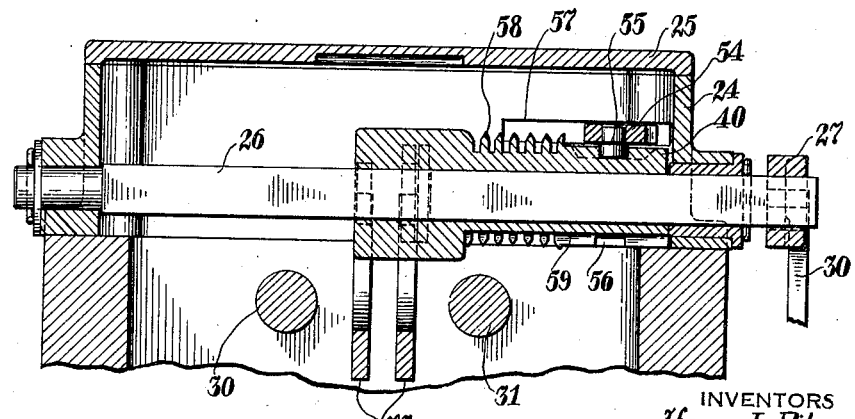
Figure 6 is a view in section, taken on line 6—6 of Figure 5, and looking in the direction of the arrows.

Referring to the above drawings, the chassis of a motor vehicle is indicated at 10 and is provided with an engine 11 and transmission shaft 12. A clutch bell housing is shown at 13 and carries a transmission housing 14 of standard design. The standard clutch pedal is shown at 15 and the steering column at 16, the latter being provided with a steering wheel 17 upon which a selecting arm 18 is mounted. The selecting arm is carried by a shaft within the steering column 16 and is connected at its lower end, to an arm 19 which carries a link 20 for transmitting movement of the arm to bell crank lever 21. The other arm of bell crank lever 21 is connected to an arm 22 of the shifting mechanism described hereinafter by means of a link 23.

Upon the top of the transmission housing 14, a housing 24 is secured, this housing being provided with a lid 25 and journaling a shaft 26. Crank arm 27 is carried by the shaft 26 and is connected to the clutch release shaft 28 by means of a lever 29 and link 30. When the clutch pedal 15 is actuated the shaft 26 is turned and perfects the shifting operations as described hereinafter.

The transmission mechanism is provided with two shifter shafts 30 and 31 upon which are mounted the shifter forks 32 for engaging the respective gear sets of the transmission mechanism. These forks are mounted upon sleeves 33 which are carried by the shafts 30 and 31. Mounted transversely within the housing 24 is a shaft 34 upon which arms 35 are journaled. The lower extremities of arms 35 are connected to the respective sleeves 33 by means of links 36 and movement of the sleeves is effected by means of devices for actuating the arms 35 as described hereinafter.

A shaft 26 is provided with a squared section and slidably carries a sleeve 40 having a head 41. This head is provided with a plurality of rollers 42, the axes of which lie in a common plane and spaced upon opposite sides of the shaft 26. The rollers are offset laterally and the head is provided with recesses 43 upon opposite sides thereof, and aligned with the respective rollers.

When the mechanism is in a normal neutral position, the head and rollers are in the position shown in Figure 8 and are thus adapted to be slid along the shaft 26. This sliding movement is the movement which selects a desired gear shifting operation and is effected in the following manner.

Within the housing 24, a guide plate 44 is mounted being pivoted at 45. The guide plate is formed with an outwardly extending arm 22 which is connected to the link 23 and the other extremity of the arm forms a head within which a guide groove or slot 47 is formed. A notched lock plate 48 is carried by the guide plate and a detent 49 normally engages the notches of the plate 48 under pressure of spring 50 to maintain the guide plate in any position to which it has been moved.

An arm 51 is pivoted at 52 in one wall of the housing and is provided with a roller 53 which engages the slot 47. The arm is formed with an offset portion 54 and carries a pin or roller 55 which is adapted to engage a groove 56 in the sleeve 40, as described more particularly hereinafter. It is desired that the free end of arm 51 be received within a slot 57 in one wall of the housing 24 to steady the movement of the arm about its pivot 52.

Upon the sleeve 40, and between the groove 56 and the head 41, are a plurality of spaced discs 58 which are spaced in exact accordance with the offset between the rollers 42. The discs 58 are cut away as at 59 to permit the sleeve and discs to be moved axially along the shaft 26 with respect to a stationary arm 60, carried upon a cross member 61 in the housing. The arm 60 is provided preferably with a plurality of locking fingers 62 which engage between the spaced discs 58. The peripheries of the discs are preferably tapered as clearly shown in the drawings, to facilitate the engagement with the finger 62 therebetween as the shaft 26 is rocked. This mechanism insures the correct lateral sliding movement of the sleeve 40 upon the shaft 26 to position the rollers 42 properly with respect to the mechanism actuated thereby to perfect the shifting operation.

Groove 56 flares outwardly at 63 and affords a safety mechanism which prevents the improper manipulation of the mechanism during a shifting operation, at the same time permitting an incorrect selection to be corrected prior to the actual engagement of the transmission gears. The foregoing is accomplished in view of the fact that, when the clutch pedal is depressed, shaft 26 and sleeve 40 are turned in such fashion that the groove 56 moves away from the pin or roller 55 and the widened portion defined by the flares 63 receives the pin. At this time, actuation of the selective mechanism does not affect the shifting mechanism inasmuch as free movement of the pin 55 is permitted in the widened portion of the groove 56 defined by the flares 63. In this fashion, when the clutch pedal is depressed, the selective mechanism may be actuated as desired and, upon releasing the pedal, the engagement of pin 55 with either side of the flaring portions 63 will shift the sleeve 40. Mounted slidably within the housing 24 are slide bars 70 and 71. The bars are secured at their remote ends to the respective links 35 by means of the pivot connection 72, and sliding movement of the bars is thus transmitted to the respective sleeve 33. An offset U-shaped portion 73 is formed on each bar and, at the extremities of the offset portions, cams 74 and 75 are formed. These cams are adapted to be engaged by the rollers 42 or, when not engaged by the rollers, to lie within the slots or recesses 43 formed in the head 41. In other words, upon rocking of shaft 26, one of the rollers 42 will engage either of the cams 74 or 75 of either of the slide bars 70. The cam not so engaged by a roller upon actuation of shaft 26, moves with the axial movement of the respective slide bar due to continued engagement and turning of a roller 42 under the cam engaged thereby. This movement is permitted by means of the slots 43 as previously described and the rotary motion of the shaft 26 is thus utilized to shift a selected shifter shaft 30 or 31 in the desired direction. By providing means to shift both shafts in either direction, four speed changes are provided as will be readily understood.

The operation of the mechanism described above will now be set forth. The operator of the vehicle initially actuates the manual lever arm 18 to move the guide plate 44 into a desired position, thus selecting a shifting operation. Movement of the guide plate causes pivotal movement of arm 51 since the roller 53 on the arm follows the lateral trend of the groove 47 in the guide plate. The groove in the guide plate has been shown to provide four positions of the roller which result in the axial movement of sleeve 40 the proper amount to engage the respective slide rods in succession. The bottom of the groove, as viewed in Figure 9, is the position in which the third forward speed is secured, this position representing the extreme left hand position of the head 41 and the corresponding position in which one of the rollers 42 engages cam 74 of the slide rod 71 to cause the low gear connection to be effected. As the guide plate is swung in a clockwise direction, the sleeve 40 is moved successively through positions thereof, wherein the intermediate low and neutral gear connections are effected. The extreme position in the clockwise movement of the arm is shown in Figure 5, wherein cam 75 of rod 70 is adapted to be engaged by one of the rollers 42 to effect the reverse gear connection.

During the selecting operation, the sleeve 40 is freely slidable axially of the shaft 26 in view of the fact that the cut away portions 59 of the discs 58 permit relative movement thereof with respect to finger 62 or arm 60. After the selecting operation has been perfected, the clutch pedal 15 is actuated to disengage the transmission mechanism from the engine and the shifting operation is simultaneously perfected. Movement of the clutch pedal rocks the shaft 26 to cause a selected roller 42 to engage one of the cams of a selected rod 70 or 71. The accuracy of the movement of the sleeve 40 is controlled by means of the arm 60 and finger 62, insuring the positioning of the rollers 42 accurately in the plane of the respective cams 74 and 75.

By placing the rollers 42 upon opposite sides of the head, the required number is halved since the movement of the rollers is reversed upon opposite sides of the head.

It will thus be seen that the mechanism by means of which a gear changing operation is effected requires but a relatively few number of parts. Coordinating with the means for perfecting the shifting operation which includes the head 41, shaft 26, and slide bars 70 and 71, is the selecting mechanism which comprises the few elements including the guide plate 44 and arm 51 for properly positioning the actuating head 41. By providing the discs 58 and finger 62 an extremely accurate mechanism results without requiring the machining of the rest of the elements of the device. The use of arms 35, as well as the length thereof depends upon the throw required for changing the gears of the transmission. If a considerable movement is available in the bars 70 and 71, the latter may be connected directly to the shifter shafts but, in the form shown, the available movement is insufficient to so connect them and the arms 35 are utilized to amplify the movement of the rods 70 and 71. To insure the return of the bars to neutral position changing gears, the head is provided with cams 76 and 77 which engage the cams 74 and 75 of the respective bars 71 and 70 when the head is turned in perfecting a shifting operation. This positively locks a gear not actuated from accidental actuation.

While the invention is described with specific reference to the accompanying drawings, it is not to be limited, save as defined in the appended claims.

We claim as our invention:

1. Means slidable axially for shifting gears of a transmission mechanism, a rotatable shaft mounted transversely of the shifting means, a head slidable on the shaft, rollers offset laterally on opposite sides of the head for engaging the shifting means, a plurality of discs on the head spaced apart a distance equal to the offset of the rollers, said discs being recessed at the peripheries thereof, and a finger adapted to lie in the recesses when the head is moved axially and to engage between the discs when the head is rotatable.

2. Means slidable axially for shifting gears of a transmission mechanism, a rotatable shaft mounted transversely of the shifting means, a head slidable on the shaft, rollers offset laterally on opposite sides of the head for engaging the shifting means, a plurality of discs on the head spaced apart a distance equal to the offset of the rollers, said discs being recessed at the peripheries thereof and formed with sloping edges at the peripheries and at the notched portions, and a finger adapted to lie in the recesses when the head is moved axially and to engage between the discs when the head is rotated, the sloping edges serving to guide the finger between the discs to position the head properly with respect to the shifting means.

3. Means for shifting transmission gears, a head for actuating the shifting means, means for rotating the head, said head being formed with a peripheral groove having a flaring portion of greater width than the groove, and an arm for engaging the groove to shift the head axially.

4. Means for shifting transmission gears, means for actuating the shifting means, means for rotating the actuating means, positive means to move the actuating means axially in either direction when in an unactuated position, and means to permit movement of the last named means without moving the actuating means axially when the last named means is in actuated position.

5. Means for shifting transmission gears, means for actuating the shifting means, means for rotating the actuating means, means to move the actuating means axially, a peripheral groove in the actuating means having a flaring portion, and means for engaging the groove to move the actuating means axially when in a non-actuated position and to engage the flaring portion when the actuating means is in actuated position.

This specification signed this 8th day of December, A. D. 1930.

HENRY L. PITMAN.
ALFRED G. F. KUROWSKI.